United States Patent
Gilboa et al.

(10) Patent No.: US 11,620,752 B2
(45) Date of Patent: Apr. 4, 2023

(54) IMAGE-GUIDED DEPTH SAMPLING AND RECONSTRUCTION

(71) Applicant: TECHNION RESEARCH & DEVELOPMENT FOUNDATION LIMITED, Haifa (IL)

(72) Inventors: Guy Gilboa, Kiryat Tivon (IL); Adam Wolff, Haifa (IL); Shachar Praisler, Hasolelim (IL); Ilya Tcenov, Haifa (IL); Yossi Bar Erez, Kafar Sirkin (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 180 days.

(21) Appl. No.: 16/890,403

(22) Filed: Jun. 2, 2020

(65) Prior Publication Data

US 2020/0380685 A1 Dec. 3, 2020

Related U.S. Application Data

(60) Provisional application No. 62/856,252, filed on Jun. 3, 2019.

(51) Int. Cl.
*G06T 7/10* (2017.01)
*G06T 1/20* (2006.01)
*G06T 1/00* (2006.01)

(52) U.S. Cl.
CPC .............. *G06T 7/10* (2017.01); *G06T 1/0007* (2013.01); *G06T 1/20* (2013.01); *G06T 2207/20028* (2013.01)

(58) Field of Classification Search
None
See application file for complete search history.

(56) References Cited

U.S. PATENT DOCUMENTS

2021/0264626 A1* 8/2021 Liu ...................... H04N 13/254

FOREIGN PATENT DOCUMENTS

EP 2963926 A1 * 1/2016 ......... H04N 13/0022
KR 20180044279 A * 5/2018

OTHER PUBLICATIONS

Zhou, D.—"Depth Image Super Resolution Based on Edge-Guided Method"—Applied Sciences 2018—pp. 1-14 (Year: 2018).*
J. T. Barron and B. Poole. The fast bilateral solver. In European Conference on Computer Vision, pp. 617-632. Springer, 2016. arXiv:1511.03296.
J. Ku, A. Harakeh and S. L. Waslander. In defense of classical image processing: Fast depth completion on the cpu. arXiv preprint arXiv:1802.00036, 2018.
F. Ma et al. Sparse depth sensing for resource-constrained robots. arXiv preprint arXiv:1703.01398, 2017.

(Continued)

*Primary Examiner* — Bernard Krasnic
(74) *Attorney, Agent, or Firm* — The Roy Gross Law Firm, LLC; Roy Gross

(57) ABSTRACT

A method comprising: receiving an image of a scene, segmenting the image into a plurality of segments, obtaining at least one depth sample from each of at least some of the segments, and with respect to each of the at least some of the segments, assigning a value of the depth sample to each pixel in the segment, to create a depth image of the image.

15 Claims, 12 Drawing Sheets

(56) References Cited

OTHER PUBLICATIONS

F. Ma et al. Self-supervised sparse-to-dense: Self-supervised depth completion from lidar and monocular camera. arXiv preprint arXiv:1807. 00275, 2018.
Yiyi Liao et al. Parse geometry from a line: Monocular depth estimation with partial laser observation. In 2017 IEEE International Conference on Robotics and Automation (ICRA), pp. 5059-5066. IEEE, 2017. arXiv:1611.02174.
F. Ma et al. Sparse-to-dense: Depth prediction from sparse depth samples and a single image. In 2018 IEEE International Conference on Robotics and Automation (ICRA), pp. 1-8. IEEE, 2018. arXiv:1709. 07492.
Z. Huang et al. Hms-net: Hierarchical multi-scale sparsity-invariant network for sparse depth completion. arXiv preprint arXiv:1808. 08685, 2018.
Yaoxin Li et al. Depth estimation from monocular image and coarse depth points based on conditional gan. In MATEC Web of Conferences, vol. 175, p. 03055. EDP Sciences, 2018. https://doi.org/10. 1051/matecconf/201817503055.
Akram Aldroubi and Kadheinz Gröchenig. Nonuniform sampling and reconstruction in shift-invariant spaces. SIAM review, 43(4):585-620, 2001. https://doi.org/10.1137/S0036144501386986.
Isaac Amidror. Scattered data interpolation methods for electronic imaging systems: a survey. Journal of electronic imaging, 11(2):157-177, 2002. DOI:10.1117/1.1455013.
Radhakrishna Achanta et al. Slic superpixels compared to state-of-the-art superpixel methods. IEEE transactions on pattern analysis and machine intelligence, 34(11):2274-2282, 2012. doi: 10.1109/TPAMI.2012.120.
Glenn D Boreman. Modulation transfer function in optical and electrooptical systems. SPIE press Bellingham, WA, 2001.
Christian Loebich et al. Digital camera resolution measurement using sinusoidal siemens stars. In Digital Photography III, vol. 6502, p. 65020N, International Society for Optics and Photonics, 2007. DOI:10.1117/12.703817.
Prabhu Babu and Petre Stoica. Spectral analysis of nonuniformly sampled data—a review. Digital Signal Processing, 20(2):359-378, 2010. https://doi.org/10.1016/j.dsp.2009.06.019.
Simon Baker et al. A layered approach to stereo reconstruction. In Proceedings. 1998 IEEE Computer Society Conference on Computer Vision and Pattern Recognition (Cat. No. 98CB36231), pp. 434-441. IEEE, 1998. doi: 10.1109/CVPR.1998.698642.
Zhao Chen et al. Estimating depth from rgb and sparse sensing. arXiv preprint arXiv:1804.02771, 2018.
Pavel Cheben et al. Subwavelength integrated photonics. Nature, 560(7720):565, 2018. https://doi.org/10.1038/s41586-018-0421-7.
Marius Cordts et al. The cityscapes dataset for semantic urban scene understanding.In Proceedings of the IEEE conference on computer vision and pattern recognition, pp. 3213-3223, 2016. arXiv:1604. 01685v2.
Emmanuel J. Candes et al. Stable signal recovery from incomplete and inaccurate measurements. Communications on Pure and Applied Mathematics: A Journal Issued by the Courant Institute of Mathematical Sciences, 59(8):1207-1223, 2006. arXiv:math/0503066.
Nathaniel Chodosh et al. Deep convolutional compressed sensing for lidar depth completion. arXiv preprint arXiv:1803.08949, 2018.
Zvi Devir and Michael Lindenbaum. Adaptive range sampling using a stochastic model. Journal of computing and information science in engineering, 7(1):20-25, 2007. https://doi.org/10.1115/1.2432899.
Gilad Drozdov et al. Robust recovery of heavily degraded depth measurements. In 3D Vision (3DV), 2016 Fourth International Conference on, pp. 56-65. IEEE, 2016. doi: 10.1109/3DV.2016.15.
Piotr Dollár and C. Lawrence Zitnick. Structured forests for fast edge detection. In Proceedings of the IEEE International conference on computer vision, pp. 1841-1848, 2013. doi: 10.1109/ICCV.2013. 231.
Abdelrahman Eldesokey et al. Propagating confidences through cnns for sparse data regression. arXiv preprint arXiv:1805.11913, 2018.
Yuval Eldar et al. The farthest point strategy for progressive image sampling. IEEE Transactions on Image Processing, 6(9):1305-1315, 1997. doi: 10.1109/83.623193.
Simon Hawe et al. Dense disparity maps from sparse disparity measurements. In 13th International Conference on Computer Vision, 2011. doi: 10.1109/ICCV.2011.6126488.
Maximilian Jaritz et al. Sparse and dense data with cnns: Depth completion and semantic segmentation. In 2018 International Conference on 3D Vision (3DV), pp. 52-60. IEEE, 2018. arXiv:1808. 00769.
Lee-Kang Liu et al. Depth reconstruction from sparse samples: Representation, algorithm, and sampling. IEEE Transactions on Image Processing, 24(6):1983-1996, 2015. arXiv:1407.3840.
Farokh Marvasti. Nonuniform sampling: theory and practice. Springer Science & Business Media, 2012.
Moshe Mishali and Yonina C. Eldar. From theory to practice: Sub-nyquist sampling of sparse wideband analog signals. IEEE Journal of Selected Topics in Signal Processing, 4(2):375-391, 2010. arXiv:0902.4291.
Christopher V. Poulton et al. Coherent solidstate lidar with silicon photonic optical phased arrays. Optics letters, 42(20):4091-4094, 2017. https://doi.org/10.1364/OL.42.004091.
German Ros et al. The synthia dataset: A large collection of synthetic images for semantic segmentation of urban scenes. In Proceedings of the IEEE conference on computer vision and pattern recognition, pp. 3234-3243, 2016. doi: 10.1109/CVPR.2016.352.
Brent Schwarz. Lidar: Mapping the world in 3d. Nature Photonics, 4(7):429, 2010. https://doi.org/10.1038/nphoton.2010.148.
Nathan Silberman et al. Indoor segmentation and support inference from rgbd images. In European Conference on Computer Vision, pp. 746-760. Springer, 2012.
Daniel Scharstein and Richard Szeliski. A taxonomy and evaluation of dense two-frame stereo correspondence algorithms. International journal of computer vision, 47(1-3):7-42, 2002.
Carlo Tomasi and Roberto Manduchi. Bilateral filtering for gray and color images. In Computer Vision, 1998. Sixth International Conference on, pp. 839-846. IEEE, 1998. doi: 10.1109/ICCV.1998. 710815.
Hai Tao et al. A global matching framework for stereo computation. In Proceedings Eighth IEEE International Conference on Computer Vision. ICCV 2001, vol. 1, pp. 532-539. IEEE, 2001. doi: 10.1109/ICCV.2001.937562.
Jonas Uhrig et al. Sparsity invariant cnns. arXiv preprint arXiv:1708. 06500, 2017.
J. Yen. On nonuniform sampling of bandwidth-limited signals. IRE Transactions on circuit theory, 3(4):251-257, 1956.
D. Glasner et al. Super-resolution from a single image. 12th International Conference on Computer Vision, pp. 349-356, IEEE, 2009. doi: 10.1109/ICCV.2009.5459271.
Wolff, A., Praisler, S., Tcenov, I., & Gilboa, G. (2019). Image-guided depth sampling and reconstruction. arXiv preprint arXiv:1908. 01379.
Lin, G., Milan, A., Shen, C., & Reid, I. (2017). Refinenet: Multi-path refinement networks for high-resolution semantic segmentation. In Proceedings of the IEEE conference on computer vision and pattern recognition (pp. 1925-1934). doi: 10.1109/CVPR.2017.549.
Hang Zhang, Kristin Dana, Jianping Shi, Zhongyue Zhang, Xiaogang Wang, Ambrish Tyagi, Amit Agrawal; Context encoding for semantic segmentation Proceedings of the IEEE Conference on Computer Vision and Pattern Recognition (CVPR), 2018, pp. 7151-7160.
Li, Z., & Chen, J. (2015). Superpixel segmentation using linear spectral clustering. In Proceedings of the IEEE conference on computer vision and pattern recognition (pp. 1356-1363). doi: 10.1109/CVPR.2015.7298741.

* cited by examiner

IMAGE-GUIDED DEPTH SAMPLING AND RECONSTRUCTION

CROSS-REFERENCE TO RELATED APPLICATION

This application claims the benefit of priority of U.S. provisional patent application No. 62/856,252 filed Jun. 3, 2019, and entitled "IMAGE-GUIDED DEPTH SAMPLING AND RECONSTRUCTION," which is hereby incorporated herein by reference in its entirety.

BACKGROUND OF THE INVENTION

The invention relates to the field of computer vision.

In recent years, depth sensing has become essential for a variety of new significant applications. For example, depth sensors assist autonomous cars in navigation and in collision prevention. The physical constraints on active depth sensing mobile devices, such as light detection and ranging (LiDAR), yield sparse depth measurements per scan. This results in a coarse point cloud and requires an additional estimation of missing data. Traditional LiDARs have a restricted scanning mechanism. Those devices measure distance in specified angle intervals, using a fixed number of horizontal scan-lines (e.g., 16 to 64), depending on the number of transceivers. An emerging technology uses solid-state depth sensors, based on optical phased-arrays with no mechanical parts, which and scan the scene faster and in an adaptive manner. In addition, these devices are relatively inexpensive compared with those currently in use. This calls for the development of new, efficient, sampling strategies, which reduce the reconstruction error per sample.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is also provided in an embodiment, a system comprising at least one hardware processor; and a non-transitory computer-readable storage medium having stored thereon program instructions, the program instructions executable by the at least one hardware processor to: receive an image of a scene, segment the image into a plurality of segments, obtain at least one depth sample from each of at least some of the segments, and, with respect to each of the at least some of the segments, assign a value of the depth sample to each pixel in the segment, to create a depth image of the image.

There is provided, in an embodiment, a method comprising: receiving an image of a scene, segmenting the image into a plurality of segments, obtaining at least one depth sample from each of at least some of the segments, and with respect to each of the at least some of the segments, assigning a value of the depth sample to each pixel in the segment, to create a depth image of the image.

There is further provided in an embodiment, a computer program product comprising a non-transitory computer-readable storage medium having program instructions embodied therewith, the program instructions executable by at least one hardware processor to: receive an image of a scene; segment the image into a plurality of segments; obtain at least one depth sample from each of at least some of the segments; and, with respect to each of the at least some of the segments, assign a value of the depth sample to each pixel in the segment, to create a depth image of the image.

In some embodiments, the segmenting comprises determining segment boundaries based, at least in part, on detecting segment boundary pixels associated with changes in depth values in the image.

In some embodiments, the segmenting comprises detecting edges in the image, and wherein the segment boundary pixels correspond, at least in part, to the edges.

In some embodiments, the segmenting is based on a superpixel clustering method.

In some embodiments, with respect to each of the at least some of the segments, the obtaining comprises (i) determining a center-of-mass (CoM) of the segment, and (ii) obtaining the depth value associated with the CoM.

In some embodiments, a number of the plurality of segments is constrained based on a specified number of desired segments.

In some embodiments, the method further comprises applying, and the program instructions are further executable to apply, to the depth image, one of: a logarithmic transformation followed by a bilateral filter followed by an exponential transformation; or a bilateral filter.

In some embodiments, the image is a red, green, and blue (RGB) image.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Disclosed herein are a system, method, and computer program product providing for image-guided depth sampling and reconstruction.

In some embodiments, the present disclosure provides for adaptive depth sampling based on super-pixels. In some embodiments, the present disclosure provides for adaptive sampling of a scene, wherein the sampling comprises sampling of (i) a depth signal from a scene, and (ii) RGB image data of the same scene. In some embodiments, the depth sampling budget may be limited to, e.g., n samples. In some embodiments, the sampling is point-wise, wherein the algorithm may sample at any desired location of the RGB image. In some embodiments, the sampling pattern can change for each image.

In some embodiments, the present approach may outperform known depth completion methods in both indoor and outdoor scenes. In some embodiments, the present algorithm is particularly suited for autonomous navigation applications, wherein the general geometrical setting (e.g., roads, walls, sidewalks), as well as the location of significant landmarks and obstacles (e.g., at least the location of poles, signs, rocks, and objects in a room).

In some embodiments, the present algorithm provides for a relatively robust capture of the shape and boundaries of objects in an image, in a computationally fast and memory-efficient manner, based on constraining the number of samples.

In some embodiments, the present algorithm employs super-pixels (SPs), an over-segmentation technique applied to RGB images (see, e.g., R. Achanta et al., "Slic superpixels compared to state-of-the-art superpixel methods", IEEE transactions on pattern analysis and machine intelligence, 34(11):2274-2282, 2012).

As used herein, 'depth completion' is the task of depth reconstruction from scattered sparse samples of a signal. Because a depth sensor can never sample an entire scene, and because—for computational efficiency and cost reasons—it preferably take as few samples as possible of the scene, most of the points in the generated sparse image have an invalid depth value, i.e., only a small percentage of the image is covered by valid measurements.

Known methods for depth completion may be divided into 'unguided' methods, using only sparse depth input, and 'guided' methods, which are assisted by additional information (e.g., a color image). Guided methods exploit the connection between depth maps and their corresponding color image.

In some embodiments, the present algorithm comprises two stages. First, the image is segmented into depth segments by fusing depth discontinuities as borders into the semantic segmentation ground-truth. Depth discontinuities and segments with size under certain threshold may be labeled as non-valid. Second, each segment is approximated to a plane (see Eq. (1) below). During this stage, groups of planes with similar $a_1$, $b_1$, $c_1$ parameters (e.g., more than 90% similarity) are merged.

Figure 1A:
FIGS. 1A-1C show the results of an image-based depth sampling and reconstruction via the present algorithm, according to an embodiment.
Figure 1B:
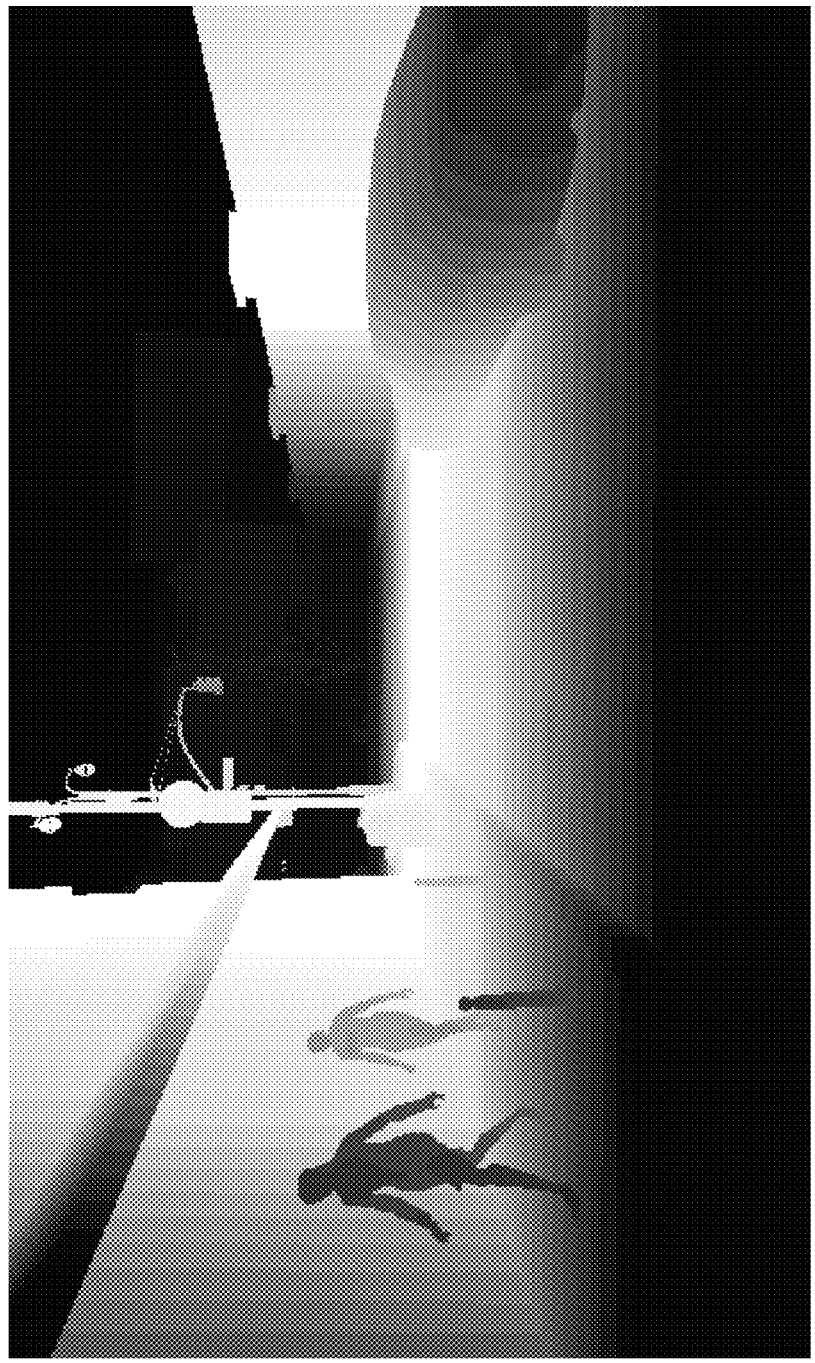
Figure 1C:
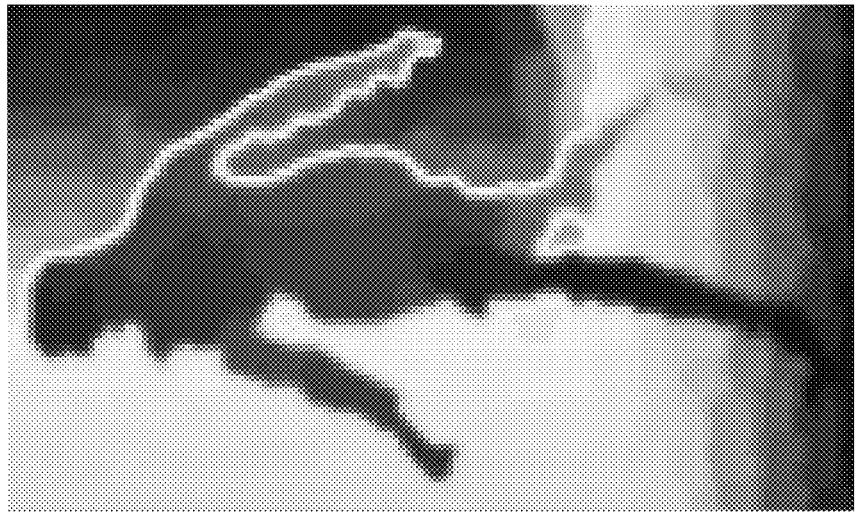
Figure 1C:
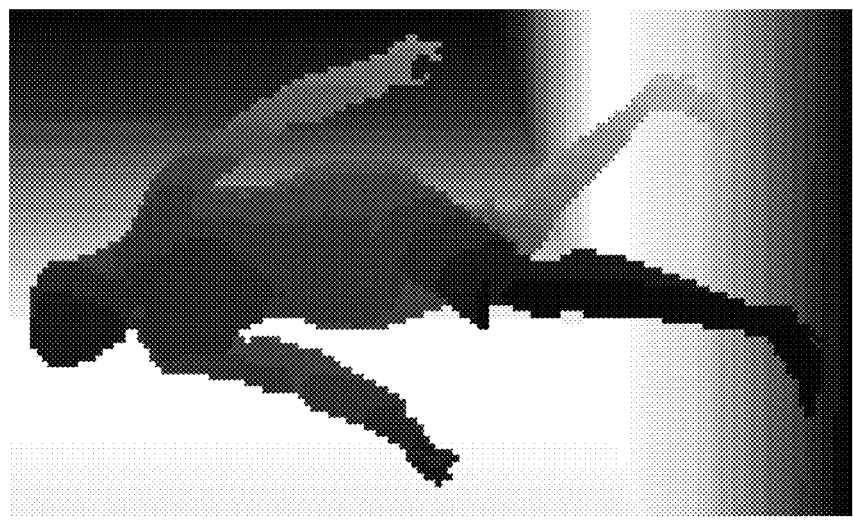

FIGS. 1A-1C show the results of an image-based depth sampling and reconstruction via the present algorithm, according to an embodiment. A red, green and blue (RGB) image (FIG. 1A) is sampled with a ground-truth depth signal (FIG. 1B), to produce a reconstruction of the depth of the scene in FIG. 1A. Panel A in FIG. 1C shows the results of 66 random depth samples, followed by bilinear interpolation, wherein an error parameter is relatively high (root mean squared error (RMSE)=0.52m). Panel B in FIG. 1C shows a reconstruction of an object in the scene using only 57 samples, wherein the results has an RMSE of 0.31m. To achieve the same RMSE, bilinear interpolation requires 669 samples.

In some embodiments, the present algorithm may be based on a piece-wise linear model. Accordingly, given a depth image d, a piece-wise linear approximation of the scene may be generated, where $\Omega \subset R^{\square}$ is the image domain with $|\Omega|$ as its area. Let $E=\Omega_i$, $i=1, \ldots N$ be a set of N sub-domains which define a partition of $\Omega$. Thus, $\Omega_i \subset \Omega$, $\Omega_i \cap \Omega_j = \emptyset$, $\forall i \neq j$, $\cup_{i=1 \ldots N} \Omega_i = \Omega$. Let $\hat{d}$ be a piece-wise linear function, defined on the domain $\Omega$ by $$\hat{d}(x,y)=a_i x+b_i y+c_i, (x,y)\in \Omega_i, i=1 \ldots N, \quad (1)$$

where $a_i$, $b_i$, $c_i$ are some constants. Let v be a binary function in $\Omega$ which indicates validity of the model, where 1 indicates validity and 0 invalidity. V denotes a set of valid points, $V=(x,y)|v(x,y)=1$. It is further assumed that $|V| \geq (1-\delta)|\Omega|$, $1 \leq \delta \ll 1$. Accordingly, given some small tolerance parameters $\delta$, $\epsilon$, a validity map v and a small number of regions N, for any depth map d there exists a piece-wise linear approximation, defined by equation (1) above, such that $$RMSE_v(d, \hat{d}) \equiv \sqrt{\frac{1}{|V|} \left\| v \cdot (d - \hat{d}) \right\|_2^2} \leq \epsilon. \quad (2)$$

Thus, d can be approximated by a piece-wise linear function, almost everywhere, provided that the partition set E and the plane parameters $a_i$, $b_i$, $c_i$ are known for each $\Omega_i$. The objective is to approximate E from the RGB image. In some embodiments, in order to recover $\hat{d}$, w each region $\Omega_i$ may be sampled, e.g., 3 times, to estimate its coefficients (in the noiseless case). This provides a lower bound on the number of samples required to obtain a high quality depth image:

$$n_{min} = \text{Number-of-Sample} \geq N. \quad (3)$$

To examine this hypothesis experimentally, the values of $\delta$, $\epsilon$ and N are verified in indoor and outdoor scenes. Thus, a piece-wise linear depth approximation was made for two datasets which have dense ground-truth depth. For outdoor scenes, there was created a high quality emulation using 787 images down-sampled to 640×380 pixels in summer sequence 5 (left stereo, front view) of the Synthia dataset (see G. Ros et al., "The synthia dataset: A large collection of synthetic images for semantic segmentation of urban scenes", in Proceedings of the IEEE conference on computer vision and pattern recognition, pages 3234-3243, 2016). For indoor scenes, 654 images downsampled and center-cropped to 304×228 pixels were used of the NYU-Depth-v2 test set (see, N. Silberman et al., "Indoor segmentation and support inference from RGBD images", in European Conference on Computer Vision, pages 746-760. Springer, 2012).

Figure 2A:
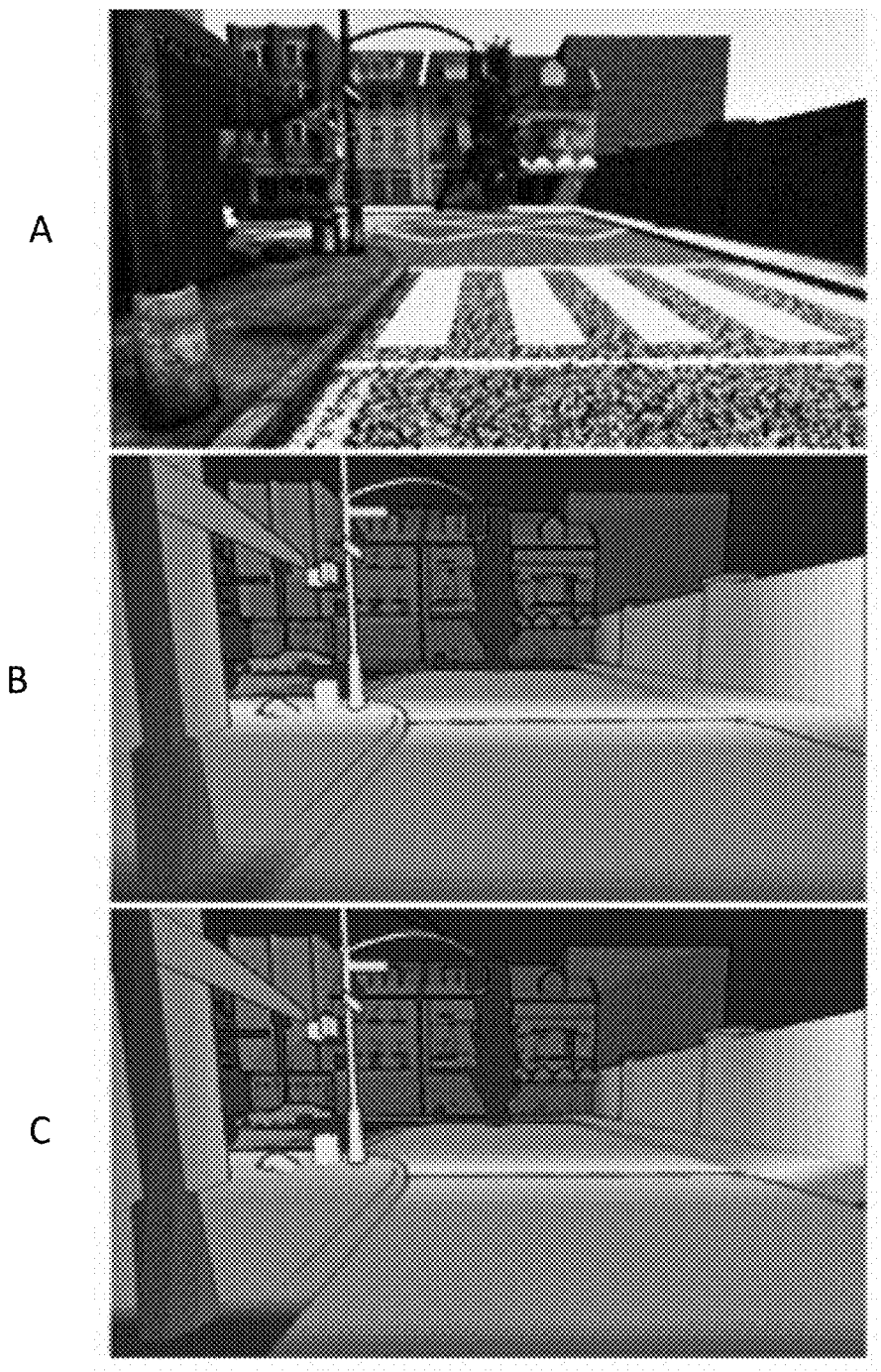
FIG. 2A shows an example of piece-wise linear approximation of an RGB image, compared to the ground truth, according to an embodiment.
Figure 2B:
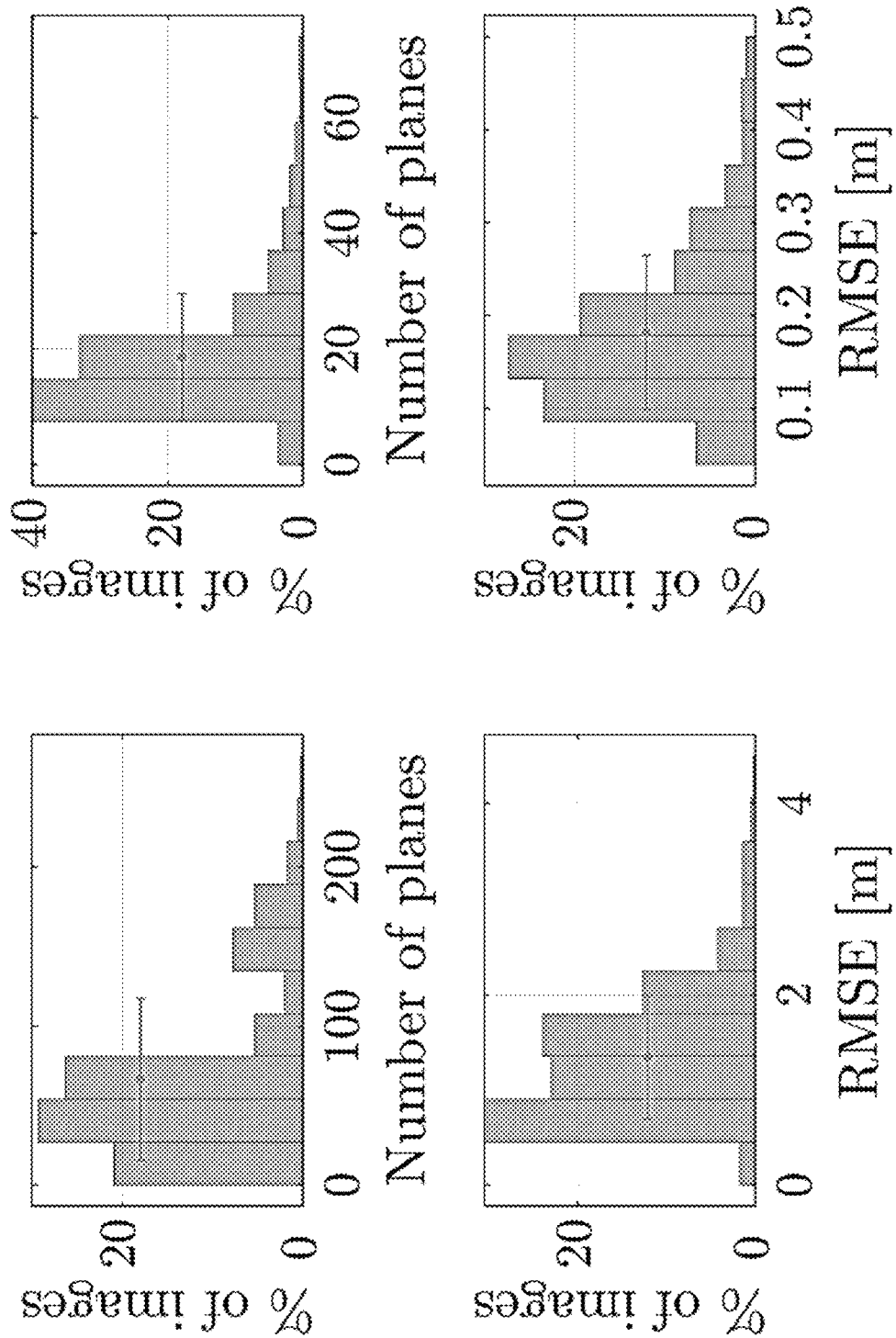
FIG. 2B presents statistical results of piece-wise linear approximation of an RGB image, according to an embodiment.

FIG. 2A shows an example of piece-wise linear approximation (panel C) of an RGB image (panel A), compared to the ground truth (panel B). Statistical results are presented in FIG. 2B. The average model parameters recovered for the Synthia dataset are N=66.6, $\delta$=0.1, $\epsilon$=1.35 m. The average model parameters recovered for the NYU-Depth-v2 dataset are N=18.5, $\epsilon$=0.07, $\epsilon$=0.18 m.

In these cases, the Synthia dataset can be approximated in an optimal scenario by an average of only 200 samples, whereas the NYU-v2 dataset can be approximated in an optimal scenario by an average of 56 samples (in both cases, this translates to about 0.08% sampling ratio, compared to the ground-truth depth resolution).

Relation of RGB and Depth

In some embodiments, the relation between RGB edges and depth discontinuities may be considered. Accordingly, given the set of RGB boundaries (edges) $B_{rgb} \subset \Omega$, and depth boundaries $B_d \subset \Omega$, the present disclosure provide for calculating empirically, for each coordinate $x=(x, y) \in \Omega$, the following conditional probabilities:

$$P_{rgb-d}=\text{Prob}(x \in B_{rgb} | x \in B_d) \quad (4)$$

$$P_{d-rgb}=\text{Prob}(x \in B_d | x \in B_{rgb}). \quad (5)$$

In some embodiments, the set $B_{rgb}$ (RGB boundaries) is calculated for each image by using, e.g., known edge-detection methods suited for, e.g., natural images. In some embodiments, a threshold of 0.2 may be set for both the Synthia and NYU-Depth-v2 datasets. In some embodiments, for the set $B_d$ (depth boundaries), a threshold may be employed on the depth gradient, normalized by the depth value. In some embodiments, the threshold may be set as 0.5 for both datasets, after converting depth values to meters.

In some embodiments, the set $B_{rgb}$ is computed for each image by using a generic edge-detector suited for natural images (see, e.g., P. Dollár et al., "Structured forests for fast edge detection", in Proceedings of the IEEE international conference on computer vision, pages 1841-1848, 2013). For the set $B_d$ a threshold was employed on the depth gradient, normalized by the depth value. In some embodiments, some tolerance may be allowed in the registration of the images due to misalignment, so for any x, the search is in a 5×5 pixel neighborhood. For the Synthia dataset, there was obtained $P_{rgb-d}$=69.3%, $P_{d-rgb}$=33.7%. For NYU-v2 dataset, there was obtained $P_{rgb-d}$=80.8%, $P_{d-rgb}$=22.9%. The high values of $P_{rgb-d}$ in each case may indicate the ability to predict depth discontinuities, based on RGB edges. The relatively low values of $P_{d-rgb}$ may indicate the existence of false partitions (which appear only in the RGB, but not in the depth data). Thus, it can be expected to approximate the partition set E based solely on the RGB image, by over-segmentation. As the partition is quite a rough approximation, additional samples are required, above the lower bound expressed in equation (3).

Figure 3:
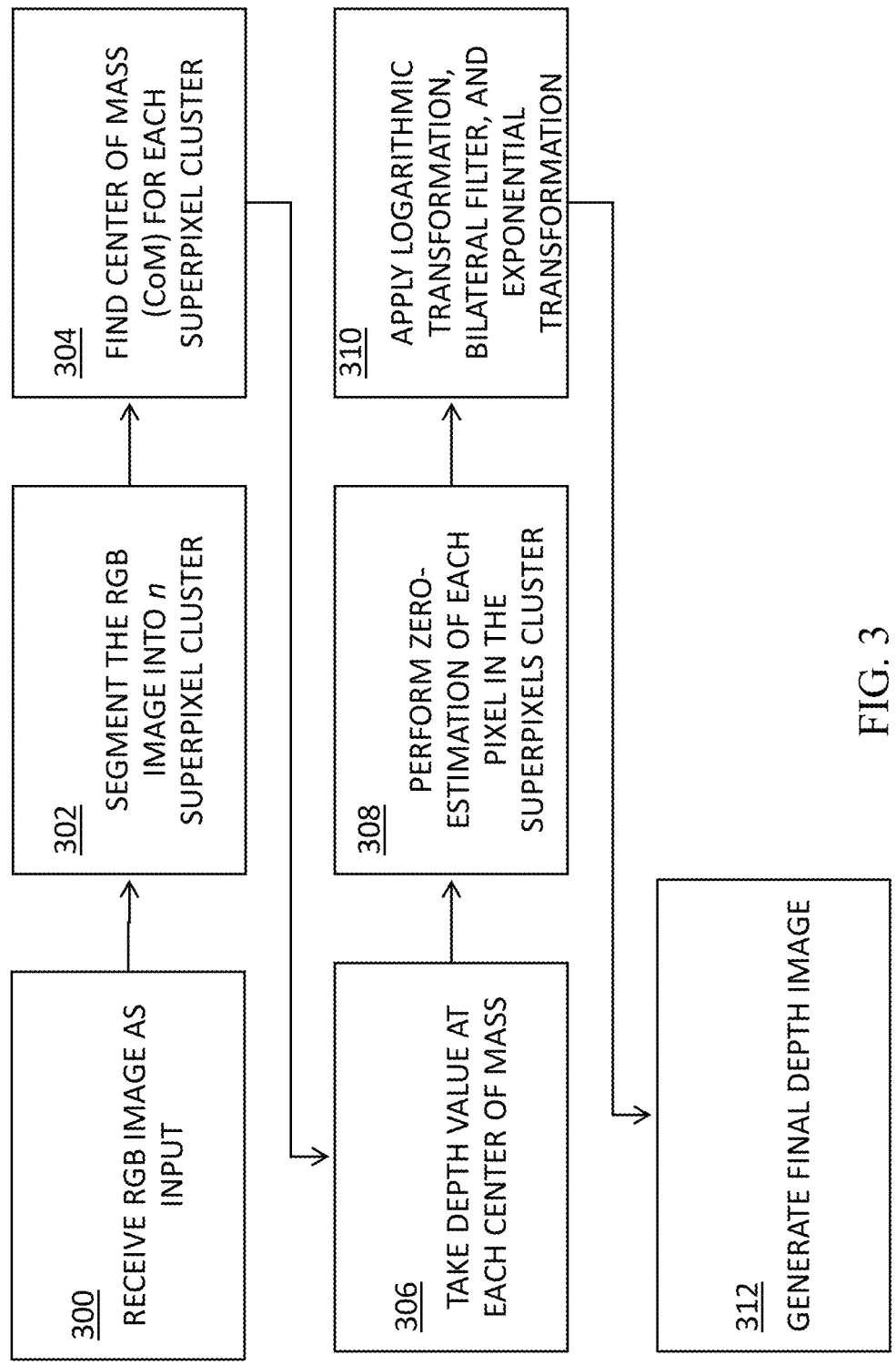
FIG. 3 is a flowchart detailing the functional steps performed by an exemplary algorithm for image-based depth sampling and reconstruction algorithm, according to an embodiment.

FIG. 3 is a flowchart detailing the functional steps performed by an exemplary algorithm for image-based depth sampling and reconstruction algorithm, according to an embodiment. At a step 300, an RGB image is received as input.

Figure 4:
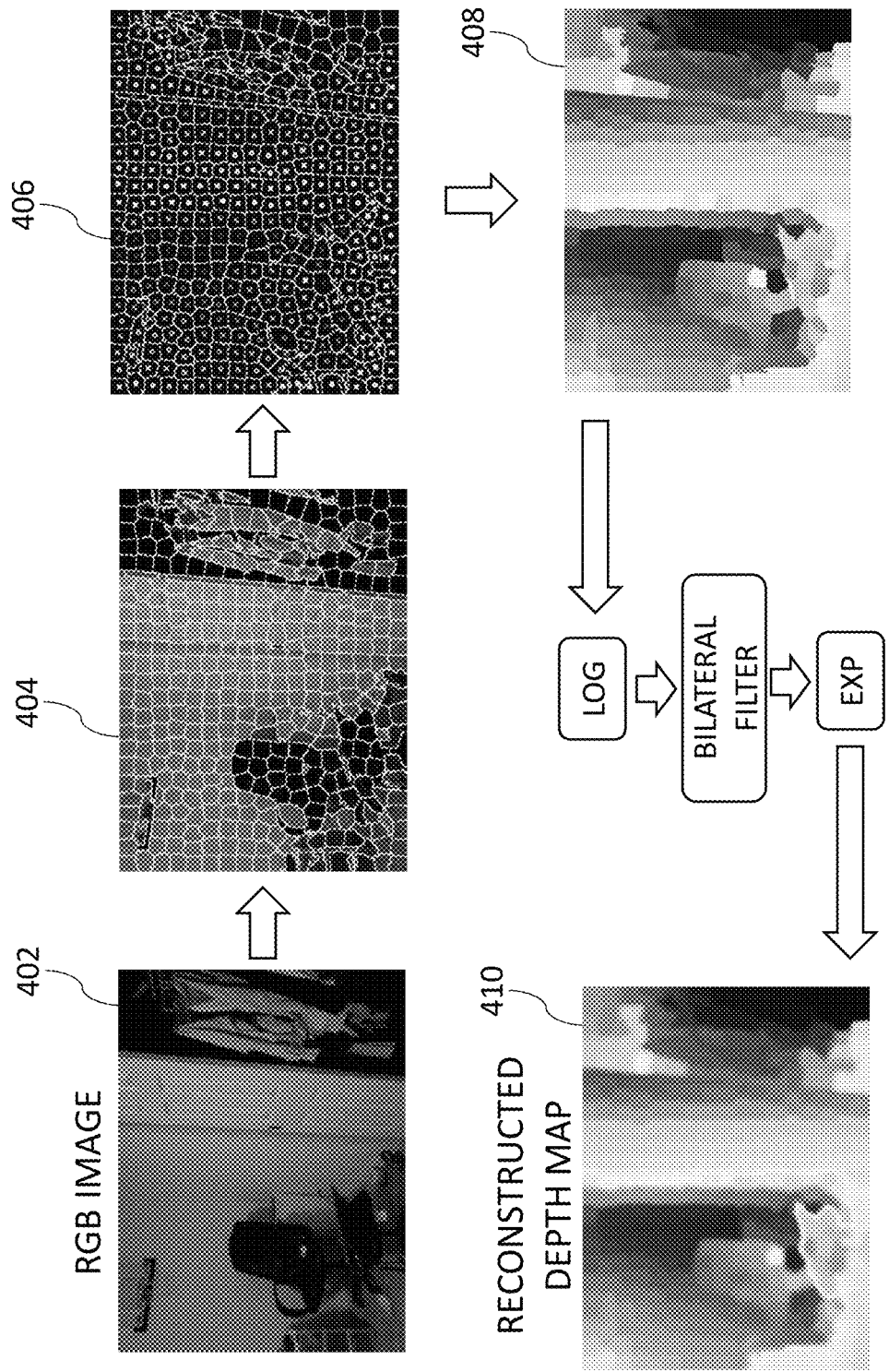
FIG. 4 is a block diagram of the functional steps performed by an exemplary algorithm for image-based depth sampling and reconstruction algorithm, according to an embodiment.

In some embodiments, at step 302, the present algorithm performs a sampling step comprising generating a superpixel map from an RGB image of a scene, using, e.g., simple linear iterative clustering (SLIC, Achanta et al [2012]). With reference to FIG. 4, an input RGB image 402 is sampled using SLIC, where the output is a superpixel map 404. In some embodiments, the desired number of superpixels (SPs) is set to n. The SPs compactness is adjusted to high value to ensure regularly shaped SPs. In some embodiments, sampling with super-pixels enables measuring small elements. It also limits reconstruction error, since the size of the segment is limited. When the depth discontinuity is not well reflected in the RGB image (e.g., with camouflaged objects), the sampling reduces to an approximate grid-sampling scheme, which provides a lower bound on the resolution.

In some embodiments, at a step 304, for each SP, the SP center of mass (CoM) is computed by calculating the mean of the (x, y) coordinates of all pixels in the SP, as shown in CoM map 406 in FIG. 4.

Figure 5:
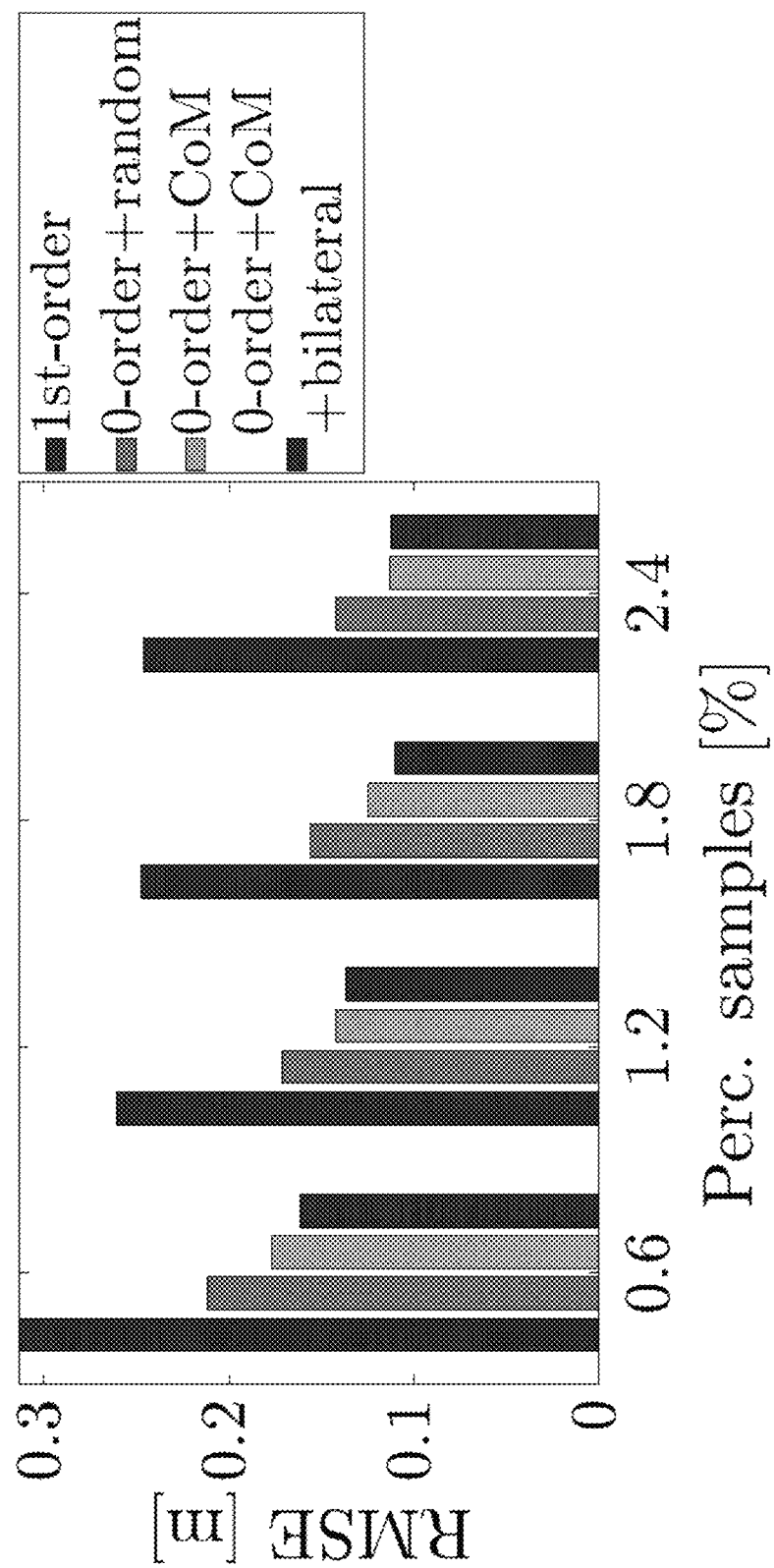
FIG. 5 demonstrates sampling results at superpixel center of mass, according to an embodiment.

In some embodiments, at a step 306, a depth sample is then taken at the CoM location, as shown in CoM depth sample map 408 in FIG. 4. If the CoM is located outside of the SP (e.g., for some non-convex SP), the depth sample is taken at the closest location to the CoM of the SP. In some embodiments, sampling at center of mass of a segment is performed so as to, e.g., reduce an inherent uncertainty near discontinuities. In addition, for piece-wise linear depth regions, the center of mass minimizes the RMSE. Moreover, practical depth sensing technologies have a finite spatial resolution and cannot sample well near depth discontinuities. FIG. 5 demonstrates that sampling at SP CoM leads to a more accurate depth reconstruction results than sampling a random pixel location inside the SP.

In some embodiments, at a step 308, a reconstruction stage may be based on the samples and SPs of the sampling stage. In some embodiments, for each SP, a single depth measurement is available, thus a zero-order estimation is performed. That is, the entire SP takes the depth value of the sample, wherein $d_o$ is the resulting depth image. In some embodiments, $d_{log}$ is calculated by $d_{log}=\log(d_0+1)$.

In some embodiments, at a step 310, a bilateral filter (see, e.g., C. Tomasi and R. Manduchi, "Bilateral filtering for gray and color images", in Computer Vision, 1998. Sixth International Conference on, pages 839-846. IEEE, 1998) is applied over $d_{log}$. The filter's parameters may be fixed for a given number of samples n and type of scene (e.g., a road, a room), wherein $d_{BF}$ is the bilateral filter result. In some embodiments, the results are then transformed using an exponential function. In some embodiments, the bilateral filter may be applied directly to $d_0$, without calculating $d_{log}$.

In some embodiments, at a step 312, the final dense reconstructed depth image, $d_r$, as shown in FIG. 4 (410), is calculated by $d_r=\exp(d_{BF})-1$.

In some embodiments, SPs are estimated by the subdomains $El_i$ of the model, which require 3 samples to obtain a plane approximation in the region of the SP. In some embodiments, different strategy may apply, wherein the number of segments may be increased by a factor of 3, and then sampled once. In some embodiments, the latter approach allows to increase the overall resolution (or smallest object size) of the algorithm, while still being able to recover large linear segments, with a proper nonlinear filtering operation. The depth of the smallest objects that the system can measure are estimated by a constant value. This facilitates the detection of poles, signs and small obstacles at a low sampling cost. As can be seen in FIG. 5, 0-order reconstruction is much more accurate than linear reconstruction in terms of RMSE, for a given sampling budget n.

Figure 6:
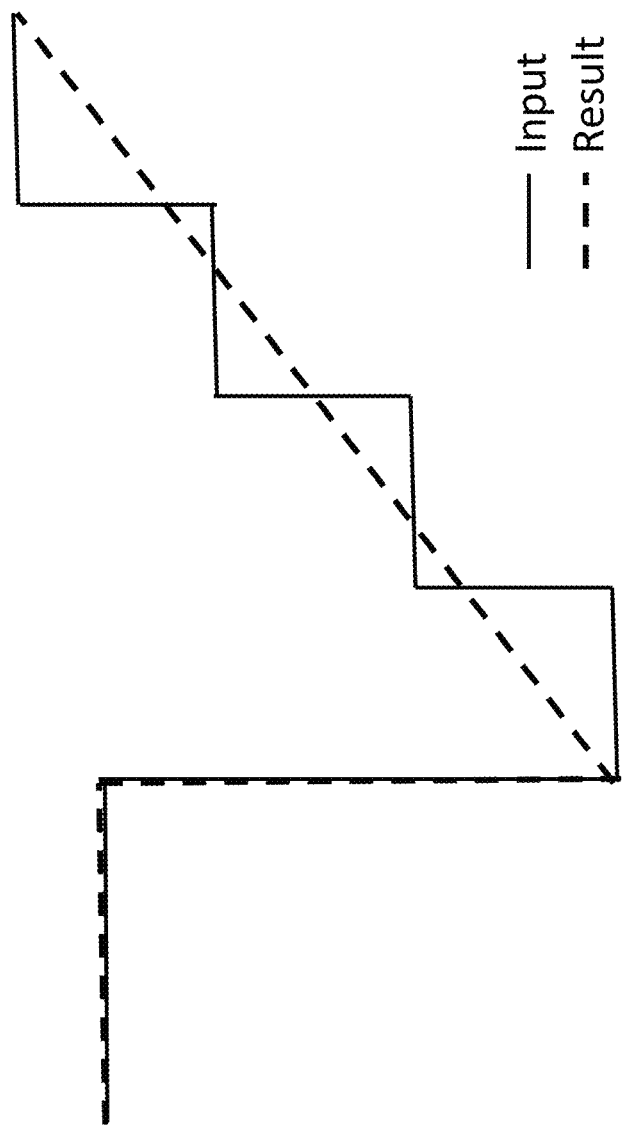
FIG. 6 schematically illustrates the results of applying a bilateral filter, according to an embodiment.

In some embodiments, having more SPs with zero-order estimation allows better sampling of smaller objects. However, now large flat regions are heavily degraded by staircasing artifacts, as schematically illustrated in FIG. 6. Accordingly, in some embodiments, the present algorithm provides for applying a fast, nonlinear, edge preserving filter (Tomasi [1998]). It is designed such that actual depth discontinuities are preserved, whereas false edges, which stem from the 0-order estimation, are smoothed out. Due to the log function, smoothing is relative to the depth. This approximates well the piece-wise linear model for large regions, such as walls and roads, yielding also lower RMSE, as seen in FIG. 5.

Figure 7:
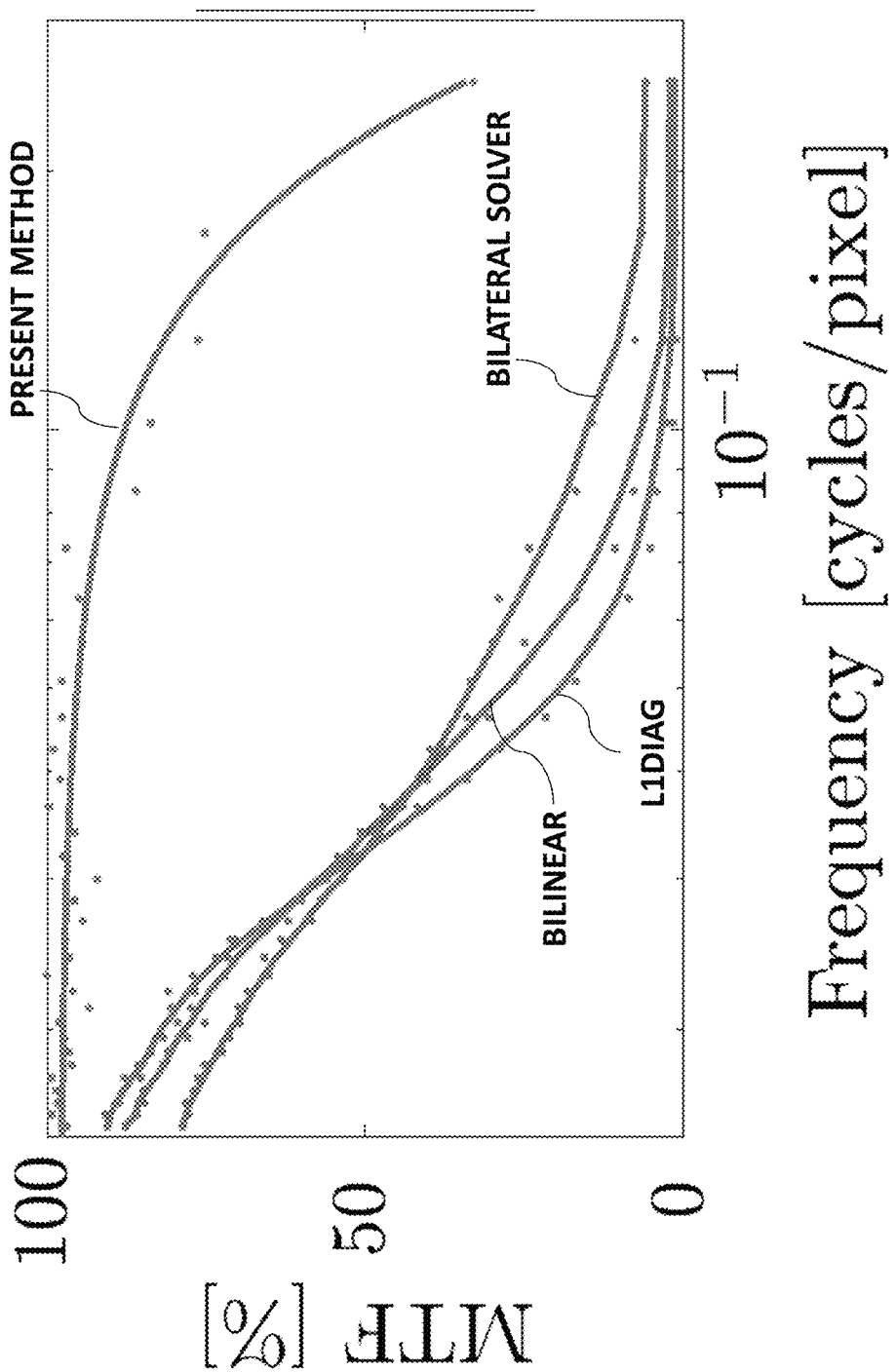
FIG. 7 presents the results computed from reconstructed images in a road-like test chart, according to an embodiment.

In some embodiments, the spatial resolution of the present sampling and reconstruction algorithm may be evaluated using a modulation transfer function (MTF) (see, e.g., G. D. Boreman, "Modulation transfer function" in optical and electro-optical systems, volume 21, SPIE press, Bellingham, Wash., 2001). The evaluation is based on a chart based on the Siemens Star test chart (see, e.g., https://en.wikipedia.org/wiki/Siemens star), modified for RGB-guided depth sampling. The original test chart is modified by a road scene, replacing the white regions with typical background content, and the black regions with typical foreground content. Depth is assumed to take binary values, as in the original chart. FIG. 7 presents the results computed from the reconstructed images in the road-like test chart. As can be seen, there is a clear increase of resolution of the proposed method, compared to RGB-guided and non-guided depth completion approaches.

In some embodiments, the MTF calculation process may employ the binary Siemens Star test-chart as a depth ground-truth. For calculation, the signal collected from 32 concentric circles at the resulting depth map may be plotted. Each signal to may be fitted to an approximation of a sine curve with $$I(\emptyset) = a + b_1 \cdot \sin\left(\frac{2\pi}{g}\emptyset\right) + b_2 \cdot \cos\left(\frac{2\pi}{g}\emptyset\right)$$

where $$g = \frac{2\pi}{32}$$

is me sine fequency and ø=arctan $$\left(\frac{x}{y}\right)$$

in the spatial angle of each pixel on the circle. In some embodiments, a, $b_1$, and $b_2$ by minimizing the square error between the fitted sine and the collected signal. Finally, the MTF for each frequency is calculated with $$MTF = \frac{\sqrt{b_1^2 + b_2^2}}{\alpha}$$

Experimental Results

The performance of the present algorithm was evaluated and compared to other approaches using uniform random depth samples at different sparsity levels. Pixel density was defined as the ratio between the number of sampled pixels to the total number of pixels in the image. To demonstrate the generalization of the present algorithm, two datasets were used for evaluation—one for outdoor scenarios and one for indoor scenarios. The outdoor dataset also included a subset of image areas focusing on small obstacles in the image. Performance was measured on all experiments with root mean squared error (RMSE), and also report the relative absolute error (REL) metric on NYU-Depth-v2.

Figure 8A:
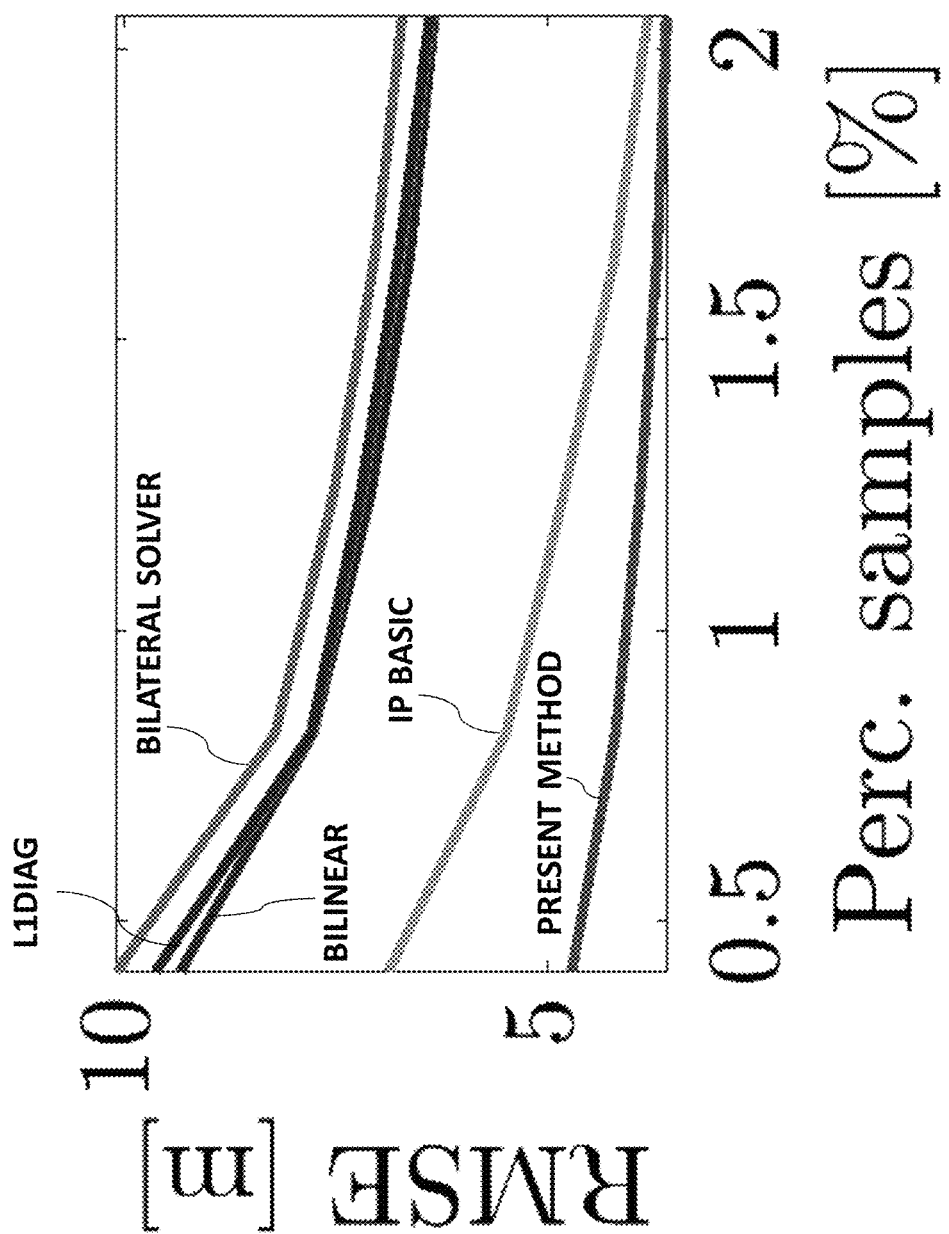
FIGS. 8A-8B present experimental results.

The Synthia dataset provides synthetic RGB, depth and semantic images for urban driving scenarios. We make the evaluation on 0-100m depth range, which is similar to the range of a typical vehicle-mounted LiDAR. As presented in FIG. 8A, the present algorithm achieved a 30% lower RMSE than the second best method, at 0.45% density, and has the best result through all densities.

Figure 8B:
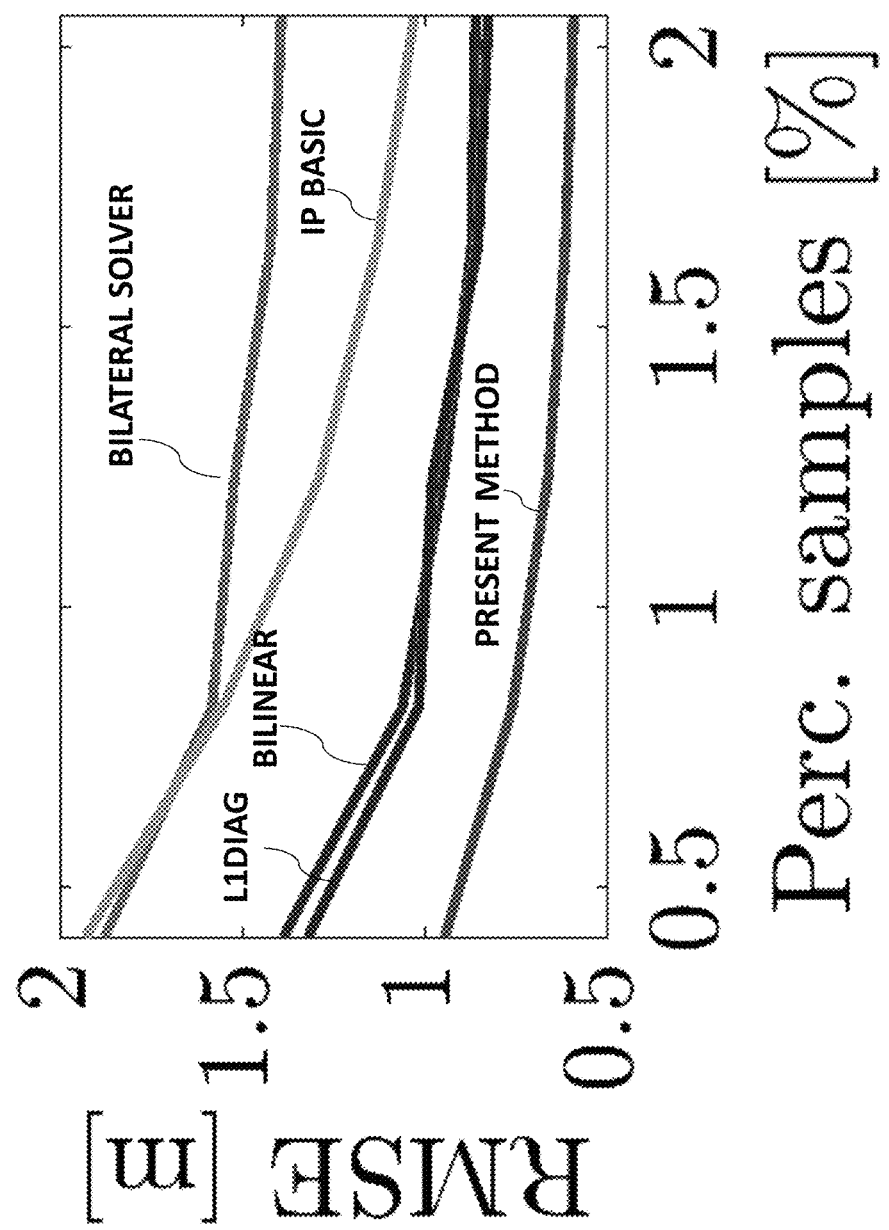

To enable evaluation over important objects in the image and to reduce the impact of far background on the performance measurement, a subset of 100 obstacles was derived from Synthia. Sampling and reconstruction were applied over the entire image, but were evaluated over the obstacle mask. Quantitative results are presented in FIG. 8B. Table 1 compares the number of samples n required to achieve certain levels of accuracy.

TABLE 1

Quantitative comparison for depth completion of required sampling percentage per RMSE

| RMSE [m] | 0.6 | 0.75 | 0.95 |
|---|---|---|---|
| Bilinear interp. | 7.87% | 2.90% | 1.23% |
| Bilateral solver [6] | >8% | >8% | >8% |
| IP-Basic [19] | >8% | 4.78% | 2.42% |
| L1diag [24] | 7.09% | 3.08% | 1.33% |
| Present Method | 1.89% | 0.86% | 0.40% |

[6] J. T. Barron and B. Poole. The fast bilateral solver. In European Conference on Computer Vision, pages 617-632. Springer, 2016.

[19] J. Ku, A. Harakeh, and S. L. Waslander. In defense of classical image processing: Fast depth completion on the cpu. arXiv preprint arXiv:1802.00036, 2018

[24] F. Ma, L. Carlone, U. Ayaz, and S. Karaman. Sparse depth sensing for resource-constrained robots. arXiv preprint arXiv:1703.01398, 2017.

The present algorithm was further evaluated as a sampling pattern, such that any completion method can achieve better results than using other existing sampling patterns.

The NYU-Depth-v2 dataset includes labeled pairs of aligned RGB and dense depth images collected from different indoor scenes. Quantitative results are listed in Table 2. The present algorithm outperforms all other methods. Note that 4 out of the other 6 methods are based on deep learning, while the present algorithm is not.

TABLE 2

Quantitative comparison with state-of-the-art on the NYU-Depth-v2 dataset

| SAMPLES | METHOD | RMSE [M] | REL |
|---|---|---|---|
| 200 | Bilinear interp. | 0.257 | 0.047 |
| 200 | L1diag [24] | 0.236 | 0.044 |
| 225 | Liao. [20] | 0.442 | 0.104 |
| 200 | Ma [27] | 0.230 | 0.044 |
| 200 | HMS-Net [17] | 0.233 | 0.044 |
| 200 | Li [22] | 0.256 | 0.046 |
| 200 | Present Method | 0.211 | 0.035 |

[24] F. Ma, G. V. Cavalheiro, and S. Karaman. Self supervised sparse-to-dense: Self-supervised depth completion from lidar and monocular camera. arXiv preprint arXiv:1807.00275, 2018.

[20] Y. Liao, L. Huang, Y. Wang, S. Kodagoda, Y. Yu, and Y. Liu. Parse geometry from a line: Monocular depth estimation with partial laser observation. In 2017 IEEE International Conference on Robotics and Automation (ICRA), pages 5059-5066. IEEE, 2017.

[26] F. Ma and S. Karaman. Sparse-to-dense: Depth prediction from sparse depth samples and a single image. In 2018 IEEE International Conference on Robotics and Automation (ICRA), pages 1-8. IEEE, 2018.

[17] Z. Huang, J. Fan, S. Yi, X. Wang, and H. Li. Hms-net: Hierarchical multi-scale sparsity-invariant network for sparse depth completion. arXiv preprint arXiv: 1808.08685, 2018.

[22] Y. Li, K. Qian, T. Huang, and J. Zhou. Depth estimation from monocular image and coarse depth points based on conditional gan. In MATEC Web of Conferences, volume 175, page 03055. EDP Sciences, 2018.

Finally, an experiment was performed over a real scene designed in a laboratory. To enable controllable sampling, a sampling device was built, comprising a laser rangefinder, a camera, motors and printed parts. Ground-truth images were generated for comparison with a Kinect 2 sensor. Two scenes were created and sampled them with 3 different patterns to evaluate the present method. In both cases, the present method was able to sample all objects (even the thinner ones) in the scene and reconstruct them quite accurately.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for reconstructing a depth image, the system comprising at least one hardware processor; and a non-transitory computer-readable storage medium having stored thereon program instructions, the program instructions executable by the at least one hardware processor to:
   receive an image of a scene;
   segment said image into a plurality of segments, based on a super-pixel clustering method;
   obtain, from a depth sensor, at least one depth sample from each of at least some of said segments; and
   with respect to each of said at least some of said segments, assign a value of said depth sample to each pixel in said segment, to reconstruct a depth image of said scene by:
   approximating each segment to a plane defined by a piece-wise linear function representation;
   merging planes with similar piece-wise linear function representations, to produce a piece-wise linear approximation of the scene; and
   applying a filter on the piece-wise linear approximation to produce a dense reconstructed depth image of the scene,
   wherein applying the filter comprises:
   applying a logarithmic transformation function on the piece-wise linear approximation;
   applying a bilateral filter on the result of the logarithmic transformation function; and
   applying an exponential transformation function on the result of the bilateral filter.

2. The system of claim 1, wherein said segmenting comprises determining segment boundaries based, at least in part, on detecting segment boundary pixels associated with changes in depth values in said image.

3. The system of claim 2, wherein said segmenting comprises detecting edges in said image, and wherein said segment boundary pixels correspond, at least in part, to said edges.

4. The system of claim 1, wherein, with respect to each of said at least some of said segments, said obtaining comprises (i) determining a center-of-mass (CoM) of said segment, and (ii) obtaining a depth value associated with said CoM.

5. The system of claim 1, wherein a number of said plurality of segments is constrained based on a specified number of desired segments.

6. The system of claim 1, wherein said image is a red, green, and blue (RGB) image.

7. A method of reconstructing a depth image, the method comprising:
   receiving an image of a scene;
   segmenting said image into a plurality of segments, based on a super-pixel clustering method;
   obtaining, from a depth sensor, at least one depth sample from each of at least some of said segments; and
   with respect to each of said at least some of said segments, assigning a value of said depth sample to each pixel in said segment, to reconstruct a depth image of said scene by:
   approximating each segment to a plane defined by a piece-wise linear function representation;
   merging planes with similar piece-wise linear function representations, to produce a piece-wise linear approximation of the scene; and
   applying a filter on the piece-wise linear approximation to produce a dense reconstructed depth image of the scene,
   wherein applying the filter comprises:
   applying a logarithmic transformation function on the piece-wise linear approximation;
   applying a bilateral filter on the result of the logarithmic transformation function; and
   applying an exponential transformation function on the result of the bilateral filter.

8. The method of claim 7, wherein said segmenting comprises determining segment boundaries based, at least in part, on detecting segment boundary pixels associated with changes in depth values in said image.

9. The method of claim 8, wherein said segmenting comprises detecting edges in said image, and wherein said segment boundary pixels correspond, at least in part, to said edges.

10. The method of claim 7, wherein, with respect to each of said at least some of said segments, said obtaining comprises (i) determining a center-of-mass (CoM) of said segment, and (ii) obtaining a depth value associated with said CoM.

11. The method of claim 7, wherein a number of said plurality of segments is constrained based on a specified number of desired segments.

12. A computer program product for reconstructing a depth image, the computer program product comprising a non-transitory computer-readable storage medium having program instructions embodied therewith, the program instructions executable by at least one hardware processor to:
   receive an image of a scene;
   segment said image into a plurality of segments, based on a super-pixel clustering method;
   obtain, from a depth sensor, at least one depth sample from each of at least some of said segments; and with respect to each of said at least some of said segments, assign a value of said depth sample to each pixel in said segment, to reconstruct a depth image of said scene by:

approximating each segment to a plane defined by a piece-wise linear function representation;

merging planes with similar piece-wise linear function representations, to produce a piece-wise linear approximation of the scene; and applying a filter on the piece-wise linear approximation to produce a dense reconstructed depth image of the scene, wherein applying the filter comprises:

applying a logarithmic transformation function on the piece-wise linear approximation;

applying a bilateral filter on the result of the logarithmic transformation function; and applying an exponential transformation function on the result of the bilateral filter.

13. The computer program product of claim 12, wherein said segmenting comprises determining segment boundaries based, at least in part, on detecting segment boundary pixels associated with changes in depth values in said image.

14. The computer program product of claim 13, wherein said segmenting comprises detecting edges in said image, and wherein said segment boundary pixels correspond, at least in part, to said edges.

15. The computer program product of claim 14, wherein, with respect to each of said at least some of said segments, said obtaining comprises (i) determining a center-of-mass (CoM) of said segment, and (ii) obtaining a depth value associated with said CoM.

* * * * *